United States Patent
Druet et al.

(10) Patent No.: US 12,241,869 B2
(45) Date of Patent: Mar. 4, 2025

(54) PASSIVE MEASUREMENT OF ACOUSTO-ELASTIC WAVES

(71) Applicant: COMMISSARIAT A L'ENERGIE ATOMIQUE ET AUX ENERGIES ALTERNATIVES, Paris (FR)

(72) Inventors: Tom Druet, Le Kremlin Bicetre (FR); Olivier Mesnil, Orsay (FR); Bastien Chapuis, Tresserce (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 241 days.

(21) Appl. No.: 17/780,480

(22) PCT Filed: Dec. 16, 2020

(86) PCT No.: PCT/EP2020/086460
§ 371 (c)(1),
(2) Date: May 26, 2022

(87) PCT Pub. No.: WO2021/122774
PCT Pub. Date: Jun. 24, 2021

(65) Prior Publication Data
US 2023/0003692 A1    Jan. 5, 2023

(30) Foreign Application Priority Data

Dec. 20, 2019  (FR) ..................... 1915243

(51) Int. Cl.
*G01N 29/14*    (2006.01)
*G01N 29/04*    (2006.01)
(Continued)

(52) U.S. Cl.
CPC .......... *G01N 29/14* (2013.01); *G01N 29/043* (2013.01); *G01N 29/0672* (2013.01);
(Continued)

(58) Field of Classification Search
CPC .. G01N 29/14; G01N 29/043; G01N 29/0672; G01N 29/069; G01N 29/2412;
(Continued)

(56) References Cited

U.S. PATENT DOCUMENTS

| 5,456,113 A * | 10/1995 | Kwun | G01N 29/2412 |
| | | | 73/622 |
| 7,997,139 B2 * | 8/2011 | Owens | G01N 29/2412 |
| | | | 702/56 |

(Continued)

FOREIGN PATENT DOCUMENTS

| FR | 3014200 A1 * | 6/2015 | ......... G01D 5/35316 |
| FR | 3073289 A1 * | 5/2019 | .......... G01M 5/0066 |

(Continued)

OTHER PUBLICATIONS

Zhang et al., Damage identification in aluminum plates based on iterative partition algorithm using waveform centroid, Wave Motion 108 (2022) 102842, p. 13 (Year: 2022).*

(Continued)

*Primary Examiner* — Stephanie E Bloss
*Assistant Examiner* — Kevin C Butler
(74) *Attorney, Agent, or Firm* — BakerHostetler (57) ABSTRACT

Methods and devices are provided for analyzing a tubular structure including at least two electromagnetic-acoustic transducers (EMAT) and, called sensors, attachable or attached in, on or in the vicinity of the tubular structure; and computation and/or memory resources, that are accessed locally and/or remotely and that are configured to determine, for the pair of sensors, a function representing the impulse response of the tubular structure on the basis of the diffuse acousto-elastic noise present in the structure. Developments describe the use of rings supporting the sensors; translation and/or rotation movements; permanent or temporary instal- (Continued)

lations; hinged rings; various computation modes, e.g., intercorrelation, a passive inverse filter, or correlation of the coda of the correlation; the use of artificial noise sources, imaging (e.g., tomography) for determining the existence of one or more defects in the structure. Software aspects are described.

14 Claims, 5 Drawing Sheets

(51) Int. Cl.
    *G01N 29/06*     (2006.01)
    *G01N 29/24*     (2006.01)
    *G01N 29/265*     (2006.01)
    *G01N 29/46*     (2006.01)
    *G01N 29/50*     (2006.01)

(52) U.S. Cl.
    CPC ....... *G01N 29/069* (2013.01); *G01N 29/2412* (2013.01); *G01N 29/265* (2013.01); *G01N 29/50* (2013.01); *G01N 29/46* (2013.01); *G01N 2291/0231* (2013.01); *G01N 2291/0234* (2013.01); *G01N 2291/0258* (2013.01); *G01N 2291/106* (2013.01); *G01N 2291/2634* (2013.01)

(58) Field of Classification Search
    CPC ...... G01N 29/265; G01N 29/50; G01N 29/46; G01N 2291/0231; G01N 2291/0234; G01N 2291/0258; G01N 2291/106; G01N 2291/2634
    USPC .......................................................... 73/587
    See application file for complete search history.

(56) References Cited

U.S. PATENT DOCUMENTS

| | | | | |
|---|---|---|---|---|
| 8,479,577 | B2 * | 7/2013 | Ganin | G01N 29/225 73/623 |
| 11,740,155 | B2 * | 8/2023 | Chapuis | G01N 29/46 702/34 |
| 2006/0027022 | A1 * | 2/2006 | Flora | G01N 29/221 73/644 |
| 2009/0139337 | A1 * | 6/2009 | Owens | G01N 29/30 73/622 |
| 2010/0199767 | A1 * | 8/2010 | Ganin | G01N 29/2412 73/623 |
| 2016/0377528 | A1 * | 12/2016 | Chapuis | G01M 5/0016 356/35.5 |
| 2022/0221429 | A1 * | 7/2022 | Popov | G01N 29/265 |
| 2023/0003692 | A1 * | 1/2023 | Druet | G01N 29/265 |
| 2023/0070346 | A1 * | 3/2023 | Mesnil | G01N 29/348 |

FOREIGN PATENT DOCUMENTS

| | | | | |
|---|---|---|---|---|
| FR | 3126780 | A1 * | 3/2023 | .......... G01M 5/0033 |
| FR | 3130378 | A1 * | 6/2023 | ............. G01N 29/04 |
| WO | 2015/082292 | A1 | 6/2015 | |
| WO | 2019/091705 | A1 | 5/2019 | |
| WO | WO-2020234394 | A1 * | 11/2020 | ........... G01N 29/043 |
| WO | WO-2021122774 | A1 * | 6/2021 | ........... G01N 29/043 |

OTHER PUBLICATIONS

A. Nokhbatolfoghahai et al., Use of dictionary learning for damage localization in complex structures, Mechanical Systems and Signal Processing 180 (2022) 109394, p. 13 (Year: 2022).*
Cawley et al., Guided waves in long range nondestructive testing and structural health monitoring: Principles, history of applications and prospects, NDT&E International 142 (2024) 103026, p. 27 (Year: 2024).*
Rose et al., Ultrasonic Waves in Solid Media, J. Acoust. Soc. Am. 107, pp. 1807-1808 (2000) (Year: 2000).*
Gunarathna et al., Challenges in Monitoring Metallic Pipeline Corrosion Using Ultrasonic Waves—A Review Article, The Institution of Engineers, Sri Lanka—vol. LIV, No. 01, pp. 67-75, 2021 (Year: 2021).*
Ono et al., Review on Structural Health Evaluation with Acoustic Emission, Appl. Sci. 2018, 8, 958; doi:10.3390/app8060958 (www.mdpi.com/journal/applsci) (Year: 2018).*
Kot et al., Recent Advancements in Non-Destructive Testing Techniques for Structural Health Monitoring, Appl. Sci. 2021, 11, 2750. https://doi.org/10.3390/app11062750, (www.mdpi.com/journal/applsci) (Year: 2021).*
Geetha et al., Laser Doppler imaging of delamination in a composite T-joint with remotely located ultrasonic actuators, Composite Structures 147 (2016) 197-210 (Year: 2016).*
Fromme et al., Guided Wave Testing, Department of Mechanical Engineering, UCL London, UK 2018, p. 26 (Year: 2018).*
Barshihnger et al., Guided Wave Resonance Tuning for Pipe Inspection, Journal of Pressure Vessel Technology, Aug. 2002, vol. 124, pp. 303-310 (Year: 2002).*
Li et al., On Circumferential Disposition of Pipe Defects by Long-Range Ultrasonic Guided Waves, Transactions of the ASME, vol. 127, Nov. 2005 pp. 530-537 (Year: 2005).*
Jacques et al, Design and In Situ Validation of a Guided Wave System for Corrosion Monitoring in Coated Buried Steel Pipes, Journal of Nondestructive Evaluation, https://doi.org/10.1007/s10921-019-0604-7, (2019) 38:65 (Year: 2019).*
Abbas et al., Structural Health Monitoring (SHM) and Determination of Surface Defects in Large Metallic Structures using Ultrasonic GuidedWaves, Sensors 2018, 18, 3958; doi: 10.3390/s18113958 (www.mdpi.com/journal/sensors) (Year: 2018).*
Ghavamian et al, Detection, Localisation and Assessment of Defects in Pipes Using Guided Wave Techniques: A Review, Sensors 2018, 18, 4470; doi:10.3390/s18124470, (www.mdpi.com/journal/sensors) (Year: 2018).*
Ma et al., Pipeline In-Line Inspection Method, Instrumentation and Data Management, Sensors 2021, 21, 3862. https://doi.org/10.3390/s21113862, (www.mdpi.com/journal/sensors) (Year: 2021).*
Wickramanayake et al., Ultrasonic ThicknessMeasuring In-Pipe Robot for Real-time Non-destructive Evaluation of Polymeric Spray Linings in DrinkingWater Pipe Infrastructure, iPipes Lab, UTS Robotics Institute, University of Technology Sydney, Oct. 31, 2022 (Year: 2022).*
Kania et al., Validation of Emat Technology for Gas Pipeline Crack Inspection, Proceedings of the 2012 9th International Pipeline Conference IPC2012 Sep. 24-28, 2012, Calgary, Alberta, Canada, p. 5 (Year: 2012).*
Tabatabaeipour et al., Application of Ultrasonic Guided Waves to Robotic Occupancy Grid Mapping, Mechanical Systems and Signal Processing (2021), p. 17 (Year: 2021).*
Gallot et al., A passive inverse filter for Green's function retrieval, Acoustical Society of America, https://doi.org/10.1121/1.3665397, Dec. 13, 2011 (Year: 2011).*
Won-Bae Na et al., Inspection of interfaces between corroded steel bars and concrete using the combination of a piezoelectric zirconate-titanate transducer and an electromagnetic acoustic tranducer, Experimental Mechanics vol. 43, No. 1, Mar. 1, 2003 (Mar. 1, 2003), pp. 24-31, XP055739813 (Year: 2003).*
Won-Bae Na, et al., "Inspection of interfaces between corroded steel bars and concrete using the combination of a piezoelectric zirconate-titanate transducer and an electromagnetic acoustic transducer", Experimental Mechanics, vol. 43, No. 1, pp. 24-31, 2003.
Oursler, et al., "Narrow-Band Hybrid Pulsed Laser/EMAT System for Non-Contact Ultrasonic Inspection Using Angled Shear Waves", Review of Progress in Quantitative Nondestructive Evaluation, pp. 553-560, 1995.
Druet, et al., "Passive guided waves measurements using fiber Bragg gratings sensors", The Journal of the Acoustical Society of America, vol. 144, 2018.

\* cited by examiner

PASSIVE MEASUREMENT OF ACOUSTO-ELASTIC WAVES

CROSS-REFERENCE TO RELATED APPLICATIONS

This application is a National Stage of International patent application PCT/EP2020/086460, filed on Dec. 16, 2020, which claims priority to foreign French patent application No. FR 1915243, filed on Dec. 20, 2019, the disclosures of which are incorporated by reference in their entirety.

FIELD OF THE INVENTION

The invention relates to the field of metrology and in particular to that of non-destructive testing and structural health monitoring.

BACKGROUND

The integrity of structures (for example, engineering structures, airplanes or pipelines) is generally checked during maintenance operations, with inspection and human intervention. An example of a specific technical problem involves, for example, detecting and sizing a corroded zone on an airplane fuselage. For these integrity checks, testing methods, called non-destructive testing (using ultrasonic, electromagnetic methods, etc.), are generally used that use a variety of transducers.

A transducer is a device that converts a physical signal into another form. A wide variety of transducers exists. For generating and receiving acousto-elastic waves transmitting in a material (a rail, a tube, a structure, etc.), the use of an ElectroMagnetic-Acoustic Transducer (EMAT) can constitute an alternative to the use of a piezoelectric sensor (PZT).

The main application of this type of EMAT sensor is non-destructive ultrasonic testing (volume elastic waves or guided elastic waves). For wave generation, EMAT-type sensors rely on the generation of a magnetic field by a magnet (or electromagnet) and then the creation of Lorentz force (in the metals) or magnetostriction (in the ferromagnetic materials) by means of an electric current passing through a coil. For wave measurement, the reverse is applied: in a magnetic field, a deformation of the material will generate a current in a coil that can be measured.

The main advantage of EMAT transducers compared to piezoelectric sensors (PZT) set forth in scientific literature is the contactless aspect of an EMAT sensor, which is generally at a distance of a few millimeters (called "liftoff") from the structure to be inspected, which allows any coupling and surface finish constraints to be overcome. This property can be crucial in integrated Structural Health Monitoring (SHM) applications, since the aging of the bonding of the sensors is a major obstacle to the deployment of such solutions. By dispensing with bonding, many specific problems are eliminated.

The major disadvantage of EMAT transducers is much lower yield than the piezoelectric transducers (PZT). If applicable, in order to generate waves with measurable amplitudes, significant electrical power needs to be used, significantly greater than with PZT transducers. In fact, at present, the main criterion for designing an EMAT inspection system is the electrical power to be supplied. A marketed system requires, for example, 6 kW of power per emission and a voltage of 1,100 volts. Laboratory systems typically reach powers of the order of 20 kW. This need for power (high voltages) for EMAT systems thus constitutes the major obstacle of this technology. Large batteries are required for portable systems. The presence of power electronics limits the number of channels and increases costs. Safety measures need to be implemented in order to ensure the safety of the operators. In the case of any work in an explosive atmosphere (ATEX), the use of high voltages and energy densities requires particular protective measures, which again drastically increase the costs and hinder the deployment of such systems. The energy supply can constitute a problem in itself. Finally, there is significant "cross-talk" between the channels (it is the measurement dead zone on all the channels when transmitting over a channel).

This power requirement is only present at the wave generation level. EMAT reception/measurement does not implement high voltages: the deformation will generate a low-intensity current in the coil of the EMAT, which will then be measured by an acquisition system. The EMAT measurement is therefore practically "free" in terms of energy (in the case whereby the magnetic field is generated by a permanent magnet, if an electromagnet is used, this will still have to be powered).

Scientific and patent literature describes many uses of EMAT transducers for generating and receiving any type of elastic waves. However, all these publications require significant electrical power for generating the waves.

Other references in literature have hybrid systems in order to dispense with significant currents. For example, the article entitled "*Narrow-band hybrid pulsed laser/EMAT system for non-contact ultrasonic inspection using angled shear waves*" (*Review of Progress in Quantitative Nondestructive Evaluation*. Springer, Boston, Mass., 1995) describes the use of a pulsed laser for generating waves and the use of EMATs for reception. In this type of article, the EMAT transducers are not used for emission. By using another system for generating waves, this method does not take full advantage of the benefits of EMAT transducers, in particular the ability to emit a preferably guided mode, and therefore is not completely satisfactory.

Finally, other solutions exist that are known from the prior art and that are based on measuring the ambient noise propagating in the structures, but they use sensors in contact with the structure, such as optical fiber Bragg gratings or piezoelectric transducers (PZT), refer to the article entitled "*Passive guided waves measurements using fiber Bragg gratings sensors*" (*The Journal of the Acoustical Society of America*, 2018). The fact that the sensors are bonded to the structure can pose a problem over time since the mechanical strength of the glue degrades subject to aging.

In the prior art, the technical problems are therefore diverse and longstanding: the electrical energy required for active emission appears to be vital and the issue of glue adhesion over time is a specific and significant issue with respect to monitoring structures for long periods of time.

Patent document WO2019091705 entitled "Monitoring the health of an industrial structure" describes an embodiment using EMAT transducers for carrying out passive imaging. This published document states that the use of EMAT sensors is particularly advantageous for monitoring fluid pipelines (gas, liquid) or "pipelines". The document describes the transducers as being generally insusceptible to aging (in particular with respect to the bonding that holds them on the structure to be analyzed).

SUMMARY OF THE INVENTION

The document describes methods and devices for analyzing a tubular structure (100) comprising at least two electromagnetic-acoustic transducers (EMAT) (121) and (122), called sensors, attachable or attached in, on or in the vicinity of the tubular structure (100); computation and/or memory resources, that are accessed locally and/or remotely and that are configured to determine, for the pair of sensors, a function representing the impulse response of the tubular structure on the basis of the diffuse acousto-elastic noise present in the structure. Developments describe the use of rings supporting the sensors; translation and/or rotation movements; permanent or temporary installations; hinged rings; various computation modes, e.g., intercorrelation, a passive inverse filter, or correlation of the coda of the correlation; the use of artificial noise sources, imaging (e.g., tomography) for determining the existence of one or more defects in the structure. Software aspects are described.

The document particularly describes geometries of structures to be inspected and the arrangement of the EMATs relative to this structure.

The possibility of passive EMAT measurement is currently an open scientific issue according to the prior art. Passive measurement using PZTs or FBGs (optical fiber Bragg gratings) has been proven: it is the subject of patent applications (by the same inventors).

In one embodiment, the method according to the invention comprises steps of carrying out a check using EMATs, without generating guided waves but by taking a measurement, called passive measurement, i.e., using the waves that are naturally present in the structure, for example, during operation (e.g., fluid flowing in a tube, turbulence on an airplane wing, train passing over a railway track, etc.). Since EMATs do not have to emit waves, the required electrical powers are relatively low (only for powering the electronic circuits for detecting and processing signals), which significantly decreases the amount of energy to be used compared to the techniques that are called active techniques (for which a very large amount of the energy is used for the emission of waves by the sensors, which is particularly true for EMATs, which have poor yield compared to other transducers). In addition, the required electronic circuit is simplified since there is no emission circuit.

Advantageously, the passive measurement mode proposed in this document allows light batteries to be used (since high voltages are no longer necessary) allowing the reception circuit, the on-board data processing unit and an optional electromagnet to be powered.

Advantageously, the methods and systems according to the invention allow integrated and/or robotic health monitoring solutions to be used.

Advantageously, since the emission circuit is not necessary, there is no high voltage in the system. This is a major advantage for operator safety and this greatly facilitates the deployment of this solution in some cases (for ATEX zones in particular, i.e., with risks of the formation of an explosive atmosphere, for which the safety measures are particularly drastic in terms of equipment comprising high voltage circuits).

Advantageously, the invention allows piping or pipelines or tubes (petrochemistry, nuclear industry, hydraulic circuits, etc.) to be inspected. More generally, all industrial fields using metal or composite structures can take advantage of the proposed solution.

Advantageously, the invention enables a drastic reduction in the powers required for inspection. This advantage is critical since it allows implementations in explosive environments (ATEX qualification) or for which the mass (aeronautical) or cost constraints are crucial.

Advantageously, the invention allows full advantage to be taken of the use of the EMATs (contactless).

Advantageously, the elastic waves are not generated by the EMAT transducers, therefore the coil does not need to be powered.

Advantageously, the monitoring and acquisition electronics are lighter and cheaper.

Advantageously, the energy requirements are significantly reduced.

Advantageously, there is no longer a "dead zone" in the measurement. The time signal can be fully analyzed, there is no need to ignore the beginning of the signal (which is saturated, therefore unusable); this enables a greater range of monitoring over the structure that is covered by the system, in particular the monitoring of circumferential waves.

Advantageously, the "contactless" property of the EMAT transducers is fully exploited (e.g., inspection robot).

BRIEF DESCRIPTION OF THE DRAWINGS

Various aspects and advantages of the invention will become apparent with reference to the description of a preferred but non-limiting embodiment of the invention, with reference to the following figures.

DETAILED DESCRIPTION

A system is described for analyzing a tubular structure (100) comprising: at least two electromagnetic-acoustic transducers (EMAT) (121) and (122), called sensors, attachable or attached in, on or in the vicinity of the tubular structure (100); computation and/or memory resources, that are accessed locally and/or remotely and that are configured to determine, for the pair of sensors (121) and (122), a function representing the impulse response of the tubular structure (100) on the basis of the diffuse acousto-elastic noise present in the structure.

The acousto-elastic field denotes the field of any mechanical waves (sound, ultrasounds, etc.) that propagate in a solid medium. Unlike the case of fluid, there are two types of acoustic waves for a solid material. These waves are better known as elastic waves (shear and compression-traction).

The noise is eliminated locally (the data would be too large to transmit). On-board electronics can process the signal and/or the data can be sent for processing on a remote server.

In one embodiment, the installation is permanent. In one embodiment, the installation is ephemeral (e.g., manual or robotic installation, infra).

In practice, the measurement signals of all the sensors are received substantially simultaneously (they are synchronized if necessary). Then, for all possible pairs, or a maximum between them, the method comprises a step of establishing the correlation of the signals. In one embodiment, pairs of sensors are considered (with each being located on a different ring). It is also possible to consider the pairs (or pairs or pairings) within the same ring. In summary, the pairs or pairings cannot be limited, since all possible pairs can be considered.

In one development, the two electromagnetic-acoustic transducers (EMAT) (121) and (122) are supported by two rings disposed around the tube to be inspected, the two electromagnetic-acoustic transducers (EMAT) (121) and (122) being located at a configurable distance, called liftoff, from the tubular structure.

The distance (131) is of the order of several diameters, namely between 10 cm and a few meters. The rings can be clippable or pluggable, for example. In other embodiments, holes or excavations are made in the ground in order to access the buried pipeline. In other embodiments, the pipeline is exposed over the entire section to be analyzed.

In one development, the system comprises a plurality N>2 of electromagnetic-acoustic transducers (EMAT) supported by two or more rings.

Some sensors can fail: the more sensors, the better the imaging resolution and the proposed solution will be more reliable in this respect. Conversely, a high number of sensors increases costs (installation, etc.). A compromise needs to be found.

It is very important to note that a very large number of sensors is not required, in particular due to the "robotic" or CND embodiments described hereafter.

The logical pairing between the sensors can be varied, at the very least exploited. The ring 1 can "work" (in terms of the signal processing computations) with the ring 2, which can work with the ring 3, etc., but the ring 1 can work directly with the ring 3. Signal processing that takes into account these pairings can benefit from this (e.g., study of the propagation paths, round-robin, etc.).

In one development, at least one ring is configured to allow the sensor that it supports to rotate about the axis of the tubular structure.

This embodiment allows the relative position of the sensors to be varied. Incidentally, it should be noted that a small number of sensors (2) can be sufficient for multiplying the measurements.

In one development, at least one ring is configured to allow the sensor to translationally move relative to the axis of the tubular structure.

This embodiment allows the relative position of the sensors to be varied. The combination of translation and/or rotation movements allows a wide variety of measurement points to be provided.

In one development, the system further comprises a plurality of electromagnetic-acoustic transducers (EMAT) arranged in a row (213) and substantially parallel to the axis of the tubular structure to be analyzed.

As a result, the axial resolution is increased. Specifically, a bar disposed between the two rings (with pivot connections, for example) can be used for supporting the EMAT sensors.

In one development, some or all of the EMAT transducers are permanently positioned in, on or in the vicinity of the tubular structure.

This embodiment corresponds to a mode called SHM mode: the rings and/or sensors are integrated into the tubular structure (e.g., molding, cast in, etc.).

In one development, a ring supporting one or more sensors is hinged, in that it comprises interconnected circular or straight segments, so as to be able to conform to internal or external bent portions and/or variable diameter sections of the tubular structure.

This embodiment, not shown, corresponds to a mode called CND or "robotic" mode: a robot supporting the two (or more) rings supporting the two (or more) EMAT sensors can circulate inside the tubular structure (whether the fluid is present and static, or moving, or it is even empty). A robot can also move outside the tubular pipeline. In one embodiment, a drone supports the two rings/sensors. According to the embodiments, the movement is carried out by a cable, tracks, wheels, etc. These embodiments benefit from the fact that the EMAT sensors do not require very precise positioning.

The analyses of the structure can follow a variety of procedures. Any "scans" can be carried out with or without recutting (of tube sections). The exploration can be carried out in several stages: a first rough and fast passage can allow the candidate anomalies to be located and then deeper analyses (e.g., repeated over time and/or space) can be centered on the selected anomalies. In other words, the distribution of the sensors over the tube can be diversified (e.g., random, patterns, lattice, etc.).

In one development, the function representing the impulse response is obtained by intercorrelation.

For each pair (A, B) of measurement points of this network, a correlation is carried out of the acoustic field u measured simultaneously over a long period at A and B, for example, by applying (other computation possibilities exist):

$$C_{AB}(t)=\int u_A(\tau)u_B(t+\tau)d\tau.$$

It has been established that the correlation (in any case its derivative) converges toward a function representing the impulse response between A and B if the various components of the wave field meet the equal energy distribution condition (the phase and amplitude distribution of the waves is random, which is called the "diffuse field" hypothesis). The impulse response between A and B is the recording that would be obtained at A if a source emitted a Dirac at B.

The equal energy distribution conditions can be obtained when the sources are randomly distributed in the medium or when the number and distribution of the sources is limited but the medium is very diffusive. Experimental demonstrations have shown that convergence was obtained in frequency ranges of interest for SHM (namely from kilohertz to a few megahertz).

For example, the sources of natural noise in the industrial structures can be those associated with the turbulent boundary layer in aeronautics, the impact of waves, the vibrations induced by the engines on a boat or a turbulent flow in a tube.

In practice, this occurs as follows: for the considered pair (A, B) another measurement point Ci is used from among all the available points. Firstly, the signals measured between A and B, on the one hand, and Ci, on the other hand, are correlated. Once the correlations CiA and CiB are carried out, the coda of these signals is correlated in order to obtain the correlation between A and B. This can be repeated over some or all of the measurement points Ci, all the obtained correlations can be summed in order to obtain a better estimate of the function representing the impulse response between A and B.

The measurement of the flight time between A and B is deduced from the function representing the impulse response obtained by the correlation. When repeated for all the pairs of possible receivers, this operation provides a significant amount of flight time data that can be used in order to carry out a tomography reconstruction at the propagation speed.

In one development, the function representing the impulse response is obtained by a passive inverse filter.

In one embodiment, the step of a passive inverse filter determining a function representing the impulse response of the structure to be analyzed comprises the steps of (i) cutting the signals measured on all the sensors into a plurality of sub-vectors or pseudo-sources and (ii) breaking down the monochromatic propagation matrices into singular values.

In one embodiment, the singular values that are obtained can be divided into two groups, a first group of values representing the physical information of interest and a second group of values (which subsequently can be set to zero). Various methods allow the threshold value to be determined (in particular according to the decay regimes of the singular values when they are ordered).

In one embodiment, the step of a passive inverse filter determining a function representing the impulse response of the structure to be analyzed comprises the steps of a) cutting the measured time signal into a plurality of sub-vectors or pseudo-sources; b) breaking down the monochromatic propagation matrices determined from the pseudo-sources in the frequency domain into singular values; c) obtaining a function representing the impulse response in the time domain by means of an inverse Fourier transform.

In one embodiment, the step of a passive inverse filter determining functions representing the impulse response of the structure for each of the pairs of polled sensors comprises the steps of:—receiving the measurement signals of the diffuse elastic field from the N physical FBG and/or PZT and/or EMAT sensors substantially simultaneously, with the diffuse elastic field not necessarily meeting an equal energy distribution condition, said measurements determining a plurality of time vectors; dividing said time vectors into a plurality of sub-vectors or pseudo-sources; carrying out, for each of the pseudo-sources, a Fourier transform at a frequency w; for each frequency w: 1) determining the monochromatic propagation matrix H(w) connecting the pseudo-sources to the measurement points; 2) determining a plurality of singular values by breaking down each matrix H(w) into singular values; 3) ordering and thresholding said singular values into a first group of values representing the physical information of interest and a second group of values set to zero; 4) determining N^2 functions representing the impulse response of the structure (one for each of the pairs of actual physical sensors);—determining N^2 temporal functions representing the impulse response of the structure by concatenating the inverse Fourier transforms of the N^2 functions representing the impulse response computed in the frequency domain.

The sub-vectors can be called "pseudo-sources".

In one development, the function representing the impulse response is obtained by correlation of the coda of the correlation C3.

In one development, the correlation measurement comprises a correlation of the coda of the correlations between sensors. As a result, the time required for installation can be reduced, the positioning errors of the measurement points can be minimized, etc. The "correlation of the coda of the correlations" comprises, for a pair of measurement points A and B, selecting any measurement point Ci selected from all the measurement points (except A and B); correlating the measurements for each of points A and B with this arbitrary measurement point Ci; correlating the coda of these correlations in order to obtain the correlation between the measurement points A and B. The operation can be repeated for some or all of the possible measurement points Ci and the correlations that are obtained can be summed in order to obtain a correlation between A and B with better reliability. All this can be applied to all or some of the possible pairs of sensors.

In one development, the system further comprises one or more artificial noise sources.

In one development, the system further comprises one or more active noise sources positioned in or on the structure so as to obtain a diffuse acousto-elastic field, i.e., that best meets the features of a diffuse field. In one embodiment, said placement or positioning is interactively guided by the ongoing measurements. In another embodiment, the location of the noise sources is determined theoretically (i.e., "predetermined"). In another embodiment, an indication is provided with respect to the suitability of said positioning (compared to the diffuse field hypothesis). In another embodiment, the multitude of noise points or sources (conjugated with random placements) tends to guarantee the achievement of a diffuse field (without a return loop, i.e., a priori). In other words, a system is disclosed that comprises one or more active noise sources that can be used as a supplement or as a replacement for the natural noise sources present in the structure, which also can be advantageous for calibration.

These additional sources can be, for example, piezoelectric transducers carefully placed in the structure, in order to be able to take measurements when desired (for example, in an airplane if the natural sources are the in-flight turbulence, additional active sources will advantageously be used in order to be able to take a measurement on the ground, when there is no more "natural" noise in the structure). These sources advantageously will be placed so as to create an acoustic field that best meets the equal energy distribution condition. For example, in order to meet this condition, the sources can be placed close to natural diffusers (or even around the zone to be monitored). Active sources integrated in the structure can be used. Non-integrated active sources also can be used: for example, a compressed air jet, the contact zone of which randomly scans the structure to be examined (so as to meet the equal energy distribution condition). The system can therefore comprise at least one noise source, with said noise source being, for example, a compressed air jet, the contact zone of which randomly scans the structure.

In one development, an active noise source can be a piezoelectric transducer, optionally of the PZT type.

In one development, the injected noise is a function of the imaging or processing of the signal.

An advantageous feedback loop involves slaving the measurements with the quality of the imaging. For example, high-frequency waves can be injected. It is also possible to inject various frequencies (f1, f2 . . . fn) and observe whether the convergence toward the function representing the impulse response is improved and/or if the image is clearer. The feedback can be controlled automatically and/or manually.

In one development, the distance between an EMAT sensor and the liftoff of the tubular structure is adaptive or adapted, in particular as a function of the obtained imaging and/or processing of the signal, for example, the speed of convergence to the Green function.

The on-board electronics can be powered by solar panels, or by dynamo energy, by energy from the flow of the fluid (submerged fin) or by a wind turbine.

A method is described for analyzing a tubular structure (100), with at least two electromagnetic-acoustic transducers (EMAT) (121) and (122), called sensors, being attachable or attached in, on or in the vicinity of the tubular structure (100), the method comprising a step of determining, for the pair of sensors (121) and (122), a function representing the impulse response of said tubular structure (100) on the basis of the diffuse acousto-elastic noise present in the structure, with computation and/or memory resources that are accessed locally and/or remotely, said determining of the function representing the impulse response for each pair of sensors being carried out by intercorrelation and/or by a passive inverse filter and/or by the correlation of the coda of the correlation.

In one development, the method further comprises a step of adhering a conductive film on the tubular structure.

In one embodiment, a thin, at least partially tubular, layer can be deposited on the tube. Thus, it is possible to analyze concrete (non-conductive) tubes.

In one development, the method further comprises a step of guided wave tomography for imaging the tubular structure.

A computer program product is described, said computer program comprising code instructions for carrying out the steps of the method, when said program is executed on a computer.

Figure 1:
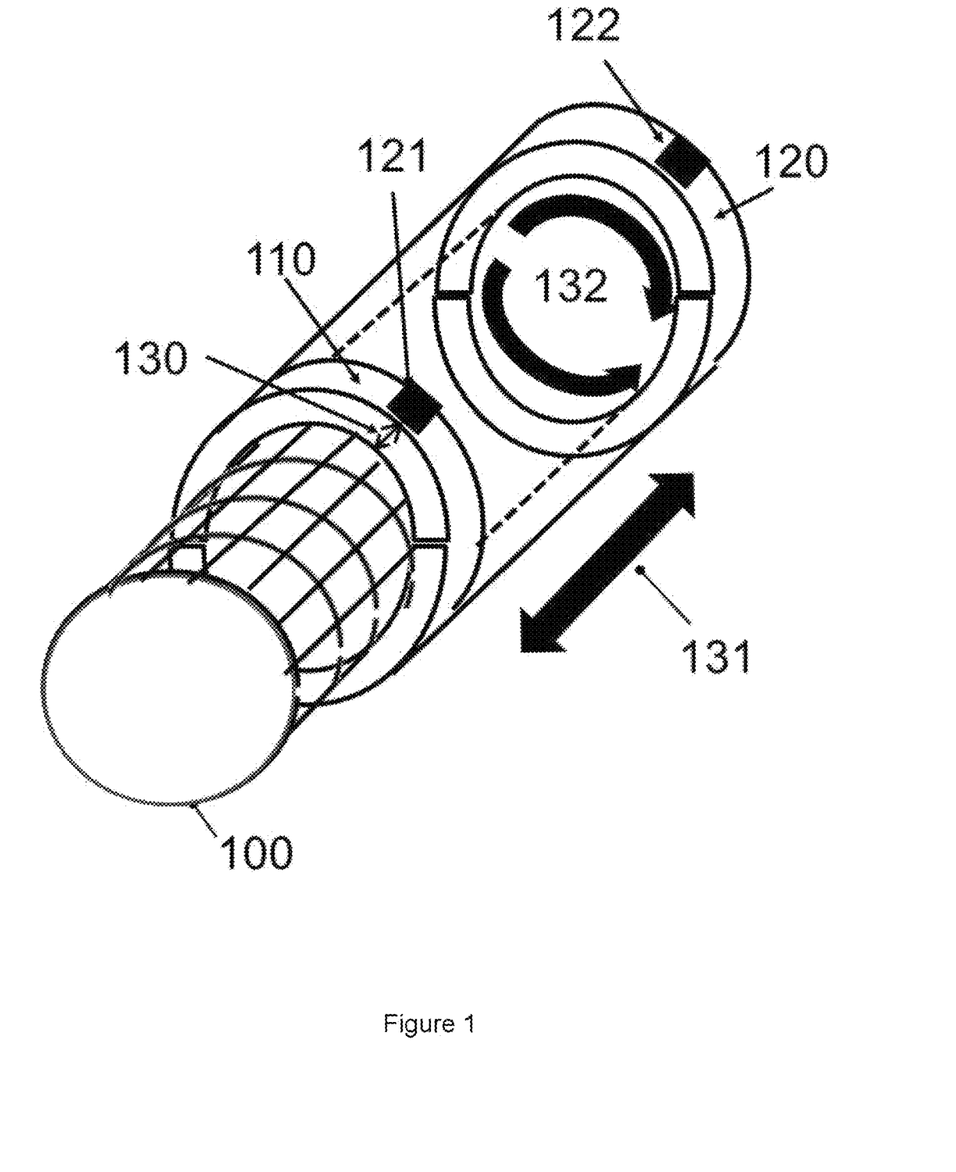
FIG. 1 illustrates an embodiment, called SHM, of the invention.

FIG. 1 illustrates one embodiment, called SHM, of the invention.

The figure shows a tube 100 (or pipe or pipeline), on which two rings 110 and 120 are arranged. The ring 110 supports one or more EMAT sensors 121. The ring 120 supports at least one sensor 122.

Distance

In one embodiment of the invention, the two rings are at a distance 131. In one embodiment, two EMAT rings are spaced apart by a reasonable distance (compared to the inspection wavelength and the diameter of the tube).

SHM Mode

In one embodiment, the EMAT transducers are disposed as a network and are permanently associated with the structure to be inspected (for example, in the bend of piping).

In one embodiment, the system according to the invention is integrated ("SHM" mode): the sensors are fixed relative to the structure (the tube can be natively instrumented, e.g., the sensors can be embedded in the concrete). In one embodiment, two rings (or collars) 110 and 120 of sensors are permanently installed around a zone that is considered to be critical. This arrangement can be advantageous since the imaging will be improved. This embodiment is more suitable in the case of sections of piping that are known to be critical since they are subject to the appearance of defects (compared to the rest of the piping): the bends are often the portions of piping with the most erosion compared to the straight sections.

Number of Sensors

In one embodiment, the two rings support a significant number of EMAT type sensors (which is not required, however).

Number of Rings

Two rings are required and sufficient for detecting defects. Adding the rings improves the resolution of the imaging.

The arrangement comprising two EMAT rings is particularly advantageous in passive mode for the following reasons. Passive acquisition is particularly favorable for iterative imaging methods and algorithms. With the measurement in effect being practically free in terms of energy, acquiring more noise signal after obtaining a first image, if its resolution is subsequently not considered to be satisfactory, in general is not a problem as it is in active mode where the emission circuits need to be reactivated (i.e., large capacitors need recharging).

Therefore, this is highly advantageous for two ring inspection configurations, for which the view of the defects is partial (with the rings only providing a limited angle of attack on the defects, some faces of the defect are not directly visible from the sensors). Indeed, in this case, imaging using virtual sensors is generally carried out in accordance with an iterative method: a first image computed from the signals measured on the physical sensors is obtained, which is used to compute the signals that would be received at virtual positions.

These signals are then re-injected in order to compute a new image with better resolution on the defect since it is based on new paths (and therefore the angle of attack of the rays) on the defect. If the process does not converge, the physical sensors must then be moved to these positions (i.e., by rotating the rings on a robotic system), and a new acquisition needs to be carried out. This imaging strategy allows a system to be used with a limited number of sensors on the rings (it is therefore less expensive and less intrusive to deploy), while obtaining an image with controlled resolution.

By contrast, working with passive EMATs allows less bulky EMATs to be used (weaker currents and therefore thinner cables, and tighter windings since there are less electric arc stresses), which allows the number of EMATs on the ring to be increased and therefore allows the quality of the imaging to be significantly improved.

Impulse Response Computation

In the next step, the equivalent guided waves between each sensor pair are reconstructed by a Passive Inverse Filter, or by correlation of the ambient noise or by correlation of the coda of the correlation (C3). This is a signal processing step (post-processing).

In a subsequent step, one or more images are determined, by applying tomography algorithms, for example. An image represents the health of the structure (presence of corrosion, erosion, a hole, etc.).

The above steps can be repeated over time, for example, to ensure continuous and regular monitoring of the structure.

Figure 2:
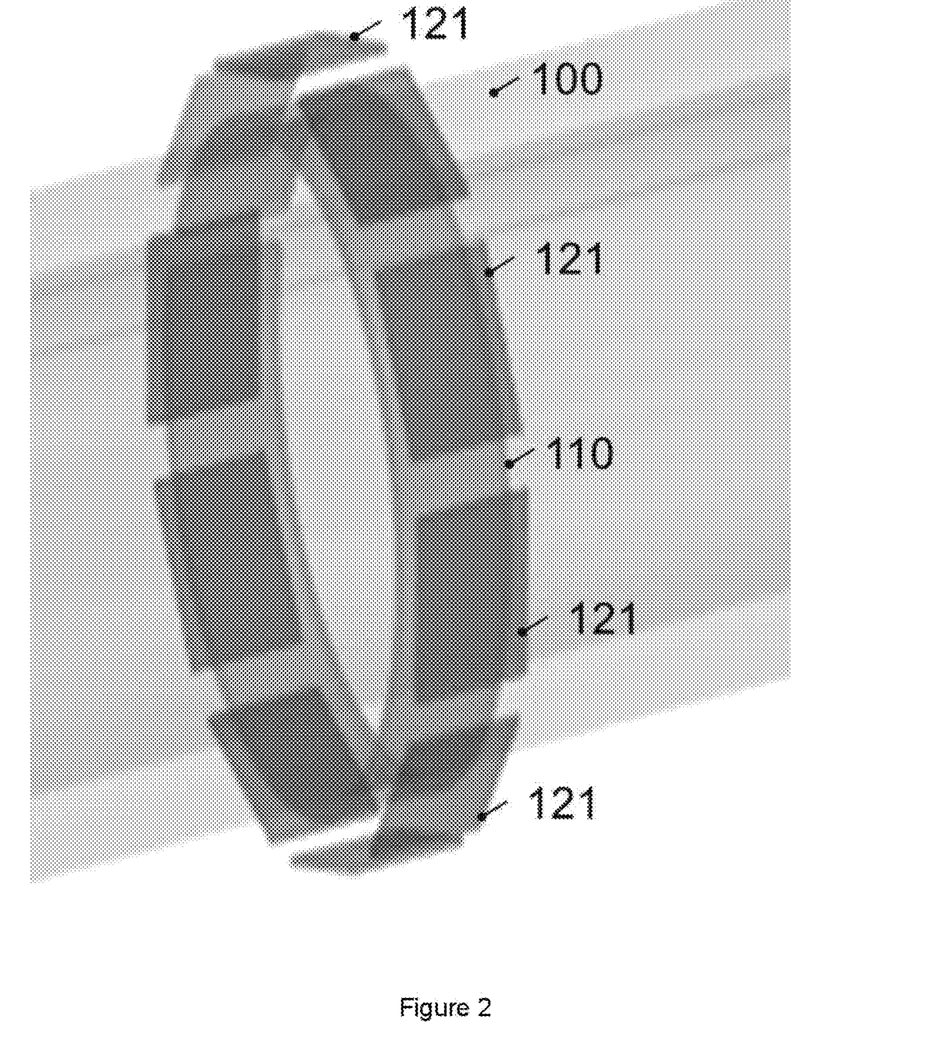
FIG. 2 shows a ring of the system according to one embodiment of the invention in greater detail.

FIG. 2 shows more details of a ring of the system according to one embodiment of the invention.

In one embodiment, the array of transducers is in the form of a ring, or a collar.

Contactless

The lack of contact ensures non-degradation of the measurement on the pipeline over time. The lack of contact particularly ensures non-degradation of the measurement on the tube over time since there is no need for coupling or glue that degrades over time in order to transmit the signal from the sensor to the metal wall of the tube. In other words, the lack of contact ensures better stability of the signal over time due to the lack of coupling or glue degrading over time. The EMAT transducers are installed so as to maintain a relatively constant liftoff 130 (distance between a sensor and the structure) between the EMAT transducers and the pipeline.

Adaptive Liftoff

Each EMAT is installed so as to maintain a sufficiently constant "liftoff" between the EMAT and the pipeline when the robot moves in the piping. The distance can be adaptive, i.e., the distance can be controlled by means of sensors and actuators. The distance can, for example, be kept substantially constant, when the sensors move in the space.

Figure 3:
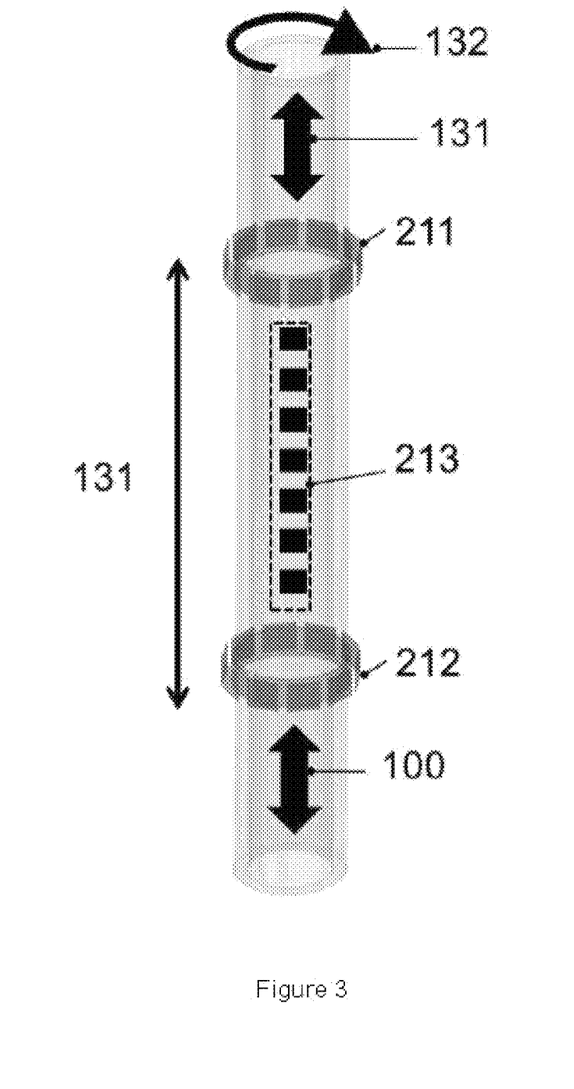
FIG. 3 shows another example of an embodiment, called CND, according to the invention.

FIG. 3 shows another example of an embodiment, called CND, according to the invention.

In one embodiment, the system according to the invention is detachable (CND mode or "robotic" mode).

The figure shows a tube 200, fitted with two rings (110, 120) of EMAT transducers. The operating mode that is illustrated corresponds to a non-destructive testing mode, i.e., with non-permanent sensors.

The ring 110 and/or the ring 120 can be moved, translationally 131 and/or rotationally 132. The movement can be manual or even automated (by an external robot, a drone, or even by mechanics inside the rings (e.g., tracks, notches, rollers, wheels, etc.). In particular, the translation and/or rotation movements can be slaved to the image quality that is obtained (infra).

In one embodiment, a row 213 can be added along the generatrix of the pipe, this allows the imaging quality to be improved further (in particular the axial resolution). This set of sensors (211, 212, 213) forms a "monitoring node" of a critical section of a structure to be inspected. It can be made completely autonomous using batteries and solar panels allowing recharging of the batteries that power the electronics that drive the node (electronics managing the acquisition of the signals and which also can be used for processing the signal and/or for transferring the data to a post-processing and decision-making unit).

For some applications, and in particular in the case of checking forced pipelines, checking the entire pipeline can be advantageous or required.

In one embodiment, the system according to the invention comprises the use of a robot supporting one or more rings of EMAT transducers.

As appropriate, the robot can move inside and/or outside the pipeline (if there are no insurmountable flanges that can hinder the movement of the robot). The use of transducers inside and outside the pipeline is advantageous in terms of imaging.

The sensors can be fixed or detachable, for example, moved by an operator or a robot.

In one embodiment, a robot integrates one or more EMAT rings allowing a check to be carried out by scanning the entirety of a forced pipeline.

Such a solution is of interest when several hundred meters of pipeline needs to be scanned. Indeed, if this pipeline is made up of a set of sections with flanges at their ends, the waveguide is disrupted by the presence of the flanges, which prevents the propagation of the guided waves over several hundred meters.

A robot allows this problem to be overcome by checking the entire pipeline section by section.

Servo-Controls

In order to improve imaging, the movable robot can then move so as to generate an overlay of the images that allows the imaging and checking to be more reliable.

In one embodiment, the robot is configured to be able to move at the bends of the forced pipeline.

Figure 4:
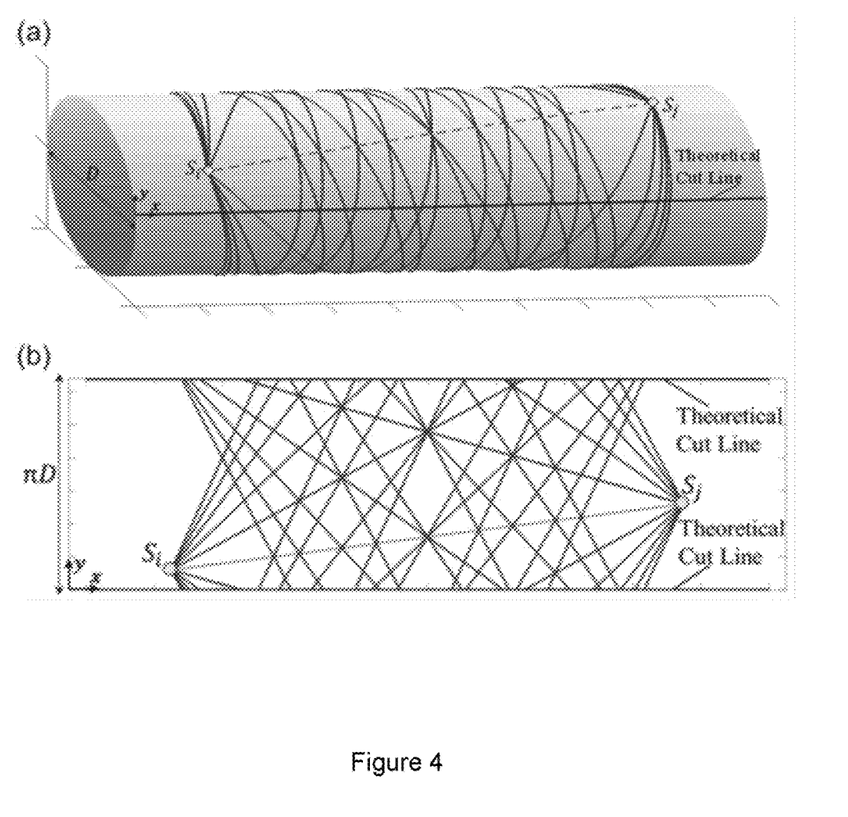
FIG. 4 illustrates the helical direct paths of the acousto-elastic waves.

FIG. 4 illustrates the direct and helical paths of the acousto-elastic waves in a tube.

Figure 5:
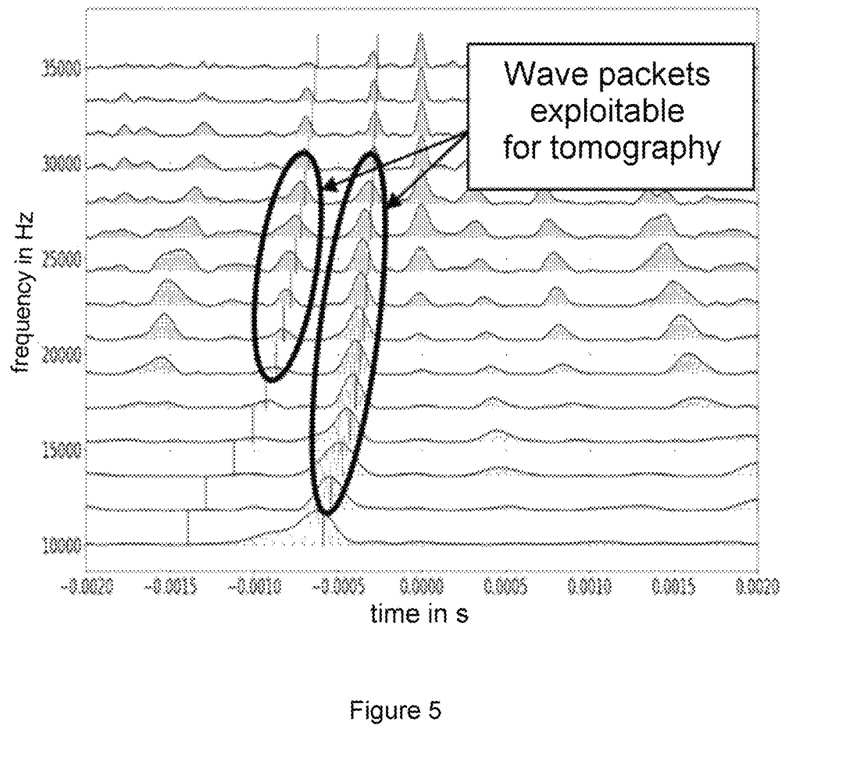
FIG. 5 shows a measurement of noise originating from the circulation of water in a stainless steel pipe.

FIG. 5 shows a measurement of noise originating from the circulation of water in a stainless steel pipe.

The stainless steel pipe has a diameter of 273 mm, and is 2 mm thick for a flow rate of 25 L/s. The passive reconstructions between 2 sensors spaced apart by 400 mm show that the noise can be used between 10 and 30 kHz for this configuration.

Passive Mode

The measurements are carried out passively, i.e., without emitting acoustic waves.

The following principles concerning the measurement modes are provided by way of a reminder, i.e., the active mode and the passive mode:

(1) A distinction needs to be made between a system operating in an active mode and a system operating in a passive mode:
   1a. in active mode, the system emits an elastic wave into the structure and measures the signal resulting from the interaction of the wave with the possible defect;
   1b. in passive mode, the system measures the waves naturally propagating in the structure (i.e., without the system emitting waves) and draws conclusions concerning the presence of a defect.

(2) There are two ways to proceed in passive mode:
   (2a) a historical method, called "acoustic emission" method, which is very well known, standardized and industrially applied;
   (2b) a method described in the present invention, called the "correlation of the ambient field" method.

(3) The difference between the two approaches of the passive mode:
   in the "acoustic emission" method (2a), the system detects the acoustic waves emitted by the defect when said defect grows:
     if the defect is present, then no emitted waves can be emitted if the defect does not change, and thus there is no detection of the defect; the system must be permanently switched on to avoid missing an acoustic emission. U.S. Pat. No. 5,456,113 A describes such an approach, as well as a solution in active mode.
   with the "correlation of the ambient field" method (2b), the time to begin the analysis of the presence of a defect is decided; the system then listens to the ambient noise and by processing the information draws conclusions concerning whether or not a defect is present:
     therefore, defect detection occurs even if the defect does not propagate;
     the system must only be switched on when intending to carry out a diagnosis.

By virtue of the passive mode (2b) that is used in the present invention, the energy consumption is reduced and allows on-board solutions (for example, on board an airplane, a boat or on the seabed) to be provided.

The method produces an easy to understand map of the zone to be tested (which limits the risks of false alarms). The method is even more efficient when the acoustic field is diffuse, i.e., when geometric elements diffract the acoustic field multiple times, which is particularly true in industrial structures that are never simple tubes but comprise, for example, stiffeners, rivets or even local excess thicknesses that diffract the waves and enhance the diffuse nature of the field.

Sources of Artificial Noise

The noise can be ambient and/or generated.

The ambient noise generated by the fluid flow can be used. In this case, in each robot position, the noise must be measured over a sufficiently long time period in order to be able to reconstruct a function representing the impulse response for each sensor pair. This operating mode has the advantage of being able to carry out the check during operation, without interrupting the circulation of the fluid in the tube.

Alternatively or additionally, the noise can be generated. Ambient noise can be generated using controlled artificial sources, for example, striking hammers, brushes rubbing outside the checked zone, vibrating pots with the advantage of not being in contact with the piping, compressed air jets, or even piezoelectric transducers, etc.). In one embodiment, the generated noise is generated as a function of the ambient noise: in other words, the generation of noise can be checked downstream, so as to explore the maximum amount of the structure.

In a first step, a flow of the fluid in the pipeline is caused or permitted. High frequency vibrations (a few tens to a few hundred kilohertz) are generated by this flow of fluid in the pipeline and measured by the EMAT transducers. The EMAT transducers are not powered during this step, with the current to be measured being generated by the vibrations. The acquisition chain is powered with low voltage.

In one development, the system further comprises one or more active noise sources positioned in or on the structure so as to obtain a diffuse acousto-elastic field, i.e., that best meets the features of a diffuse field. In one embodiment, said placement or positioning is interactively guided by the ongoing measurements. In another embodiment, the location of the noise sources is determined theoretically (i.e., "predetermined"). In another embodiment, an indication is provided with respect to the suitability of said positioning (compared to the diffuse field hypothesis). In another embodiment, the multitude of points or noise sources (conjugated with random placements) tends to ensure that the diffuse field is obtained (without a feedback loop, i.e., a priori). In other words, a system is disclosed comprising one or more active noise sources that can be used as a supplement or as a replacement for the natural noise sources present in the structure, which also can be advantageous for calibration.

Completely optionally, these additional sources can be, for example, piezoelectric transducers carefully placed in the structure in order to be able to take measurements when desired. These sources advantageously can be installed so as to create an acoustic field that best meets the equal energy distribution condition. For example, in order to meet this condition, the sources can be placed close to natural diffusers (or even around the zone to be checked). Active sources integrated in the structure can be used. It is also possible to use active sources that are not integrated: for example, a compressed air jet, the contact zone of which randomly scans the structure to be examined (so as to meet the equal energy distribution condition). The system can therefore comprise at least one noise source, with said source being, for example, a compressed air jet, the contact zone of which randomly scans the structure.

Incidentally, it can be noted that the power consumption due to these elements allowing an artificial noise to be generated remains much lower than that which would be necessary in order to emit a wave using EMATs.

Imaging Methods

In one embodiment, the method according to the invention further comprises a tomography step.

In one development, the method further comprises a step of reconstructing the propagation speeds by tomography, with the imaging being carried out by inverting all the flight times between the sensors, with each flight time for each pair of sensors being deduced from the correlation measurement. This development is optional. It has the advantage of improved subsequent interpretation.

In one development, the temperature of the structure is measured and a variation in the flight time induced by a temperature change is compensated. The temperature can indeed affect the flight time and being able to correct or compensate for the thermal effects is appreciated. Specifically, a thermocouple can be used, but other measurement methods are possible.

In one development (in SHM mode), tomography imaging of the piping is carried out by measuring at least two flight times, with a first measurement being carried out in an initial or reference state and a second measurement being carried out in a subsequent state (for the same pairs of measurement points). The subsequent state is called "current" state, it therefore corresponds to the present time of the measurement ("second measurement set").

Producing a tomography (completely optional) based on the data originating from the first measurement particularly allows certain geometric features of the piping to be identified. This corresponds to a static measurement taken in the initial (or reference) state. The imaging of the resting piping optionally can be subtracted from subsequent images of the piping (subtraction of pixels, i.e., in terms of the content of the image). In other words, this optional mapping allows certain geometric features of the piping to be identified so as to avoid confusing them with defects on the maps obtained on the second measurement set.

In one development, the method further comprises a second measurement carried out in a subsequent state for the same pairs of measurement points as the first measurement and further comprises tomography mapping of the variations in the propagation speeds in the piping between the initial state and the subsequent state obtained from the differences in the flight times measured between the two states. In other words, the variation in flight times (measured for the pairs) between the two states is measured. This allows a map to be obtained, using tomography, of the variations in the propagation speed of the elastic waves (elasto-acoustic) between the time of the measurement associated with the current state (present) and the time associated with the reference state. For example, between the time t of the measurement and the initial time t0, it will be noted that the waves move "slower" (respectively "faster") at certain locations and the identification of the defects or damage to the structure can be deduced.

According to a particular embodiment of the invention, the structure to be examined is "imaged". This imaging enables easier interpretations than those resulting from the analysis of the raw signals, since the geometric singularities of the structure appear in a visual form and are not confused with a defect. In some embodiments, the reference state is then no longer necessary.

Industrial pipes are often very geometrically complex (due to stiffeners, rivets, glued joints, etc.) and many ultrasonic echoes subsequently appear. Imaging therefore considerably helps with interpreting the signals.

Furthermore, a multitude of sensors increases the resolution of the imaging and thus enhances the advantages of the invention.

The tomography method according to the invention reverses all the measured flight times, in order to reconstruct a map of propagation speeds that is compatible with all the flight times. For guided waves, the propagation speed is dependent on the thickness of the piping (by means of a known relationship, i.e., the dispersion curves), this map of propagation speed can be transposed into a thickness map if the intention is to detect corrosion. This method also operates, for example, in order to detect the delamination of composite piping (since at the delamination the speed of the guided waves is also modified).

In the SHM embodiment, the map that is obtained is an image of the structure. This image can be interpreted: the extent of the damaged zone is made visible. For corrosion damage, for example, it is therefore possible to know the extent and the residual thickness. As a result, the severity of the damage can be evaluated, in order to take corrective measures if necessary.

In the SHM or CND mode, obtaining a map of the structure therefore allows one or more defects to be detected, without needing to subtract the signal measured at a time t from that measured at a time t0, reference state for which the structure is considered to be healthy. The prior provision of this reference state involves numerous constraints (for example, the need to build a database with measurements at all temperatures that the structure would experience, problems in the event of aging of the sensors resulting from false alarms, etc.).

Indeed, one step can involve imaging the checked zone, for example, using guided wave tomography or other imaging algorithms (DAS, SAFT, Excitelet, RAPID, etc.).

With respect to tomography, various embodiments are described hereafter.

In one embodiment, straight ray tomography with flight time input data is generally reliable and fast, but is generally limited to less extensive and shallow defects.

In one embodiment, curved ray tomography with flight time input data can take into account the refractive phenomena but it is not very reliable as soon as the defect is diffracted.

In one embodiment, wave tomography (diffraction tomography) with data comprising the monochromatic full field can take into account the diffraction phenomena but it is generally limited to small (potentially deep) defects.

In one embodiment, a hybrid type tomography (e.g., "HARBUT") with flight time input data and the monochromatic full field can take into account both the diffraction and the refraction phenomena but it can require a significant number of sensors if the maximum resolution must be achieved.

Several other imaging techniques or methods can be used, alone or in combination.

The imaging technique that focuses on all points (the "Total Focusing Method") involves acquiring the complete series of signals connecting all the emission/reception elements and coherently summing the signals on all points of the imaged zone.

The imaging technique can be carried out using synthetic aperture ("Synthetic Aperture Focusing Technique" (SAFT)). This technique allows an image to be obtained that is easy to interpret, including the influence of the transducers, their pairing and the suppression of the noise of the image.

The imaging technique can involve spatial filtering or beam forming or channel forming (namely "Beamforming"). This type of technique is a signal processing technique used in the arrays of antennas and sensors for the directional emission or reception of signals, by combining elements of a phased antenna array in such a way that in particular directions the signals constructively interfere, while in other directions any interference is destructive.

Time reversal is a physical method applicable to ultrasound that allows a wave to return to its source in the case of non-dissipative propagation.

The MUltiple Signal Classification (MUSIC) imaging technique is a high-resolution method that is particularly based on signal parametric models (e.g., particular properties of the covariance matrix of the signal, allowing the data space to be separated into two sub-spaces, namely the signal space generated by the sinusoids, and the noise space which is its orthogonal complement). In particular, the MUSIC method is based on the noise space.

In the "Excitelet" imaging technique, the residual signal is correlated with the signals from a library, called atoms, corresponding to the residual signals computed with a propagation model that comprises several modes and takes into account the dispersive effect of the material and the electromechanical impedance of the transducers.

The "Delay-and-Sum" beam forming imaging technique is a variant of the aforementioned spatial filtering. The Minimum Variance Distortionless Response (MVDR) Capon spatial filtering imaging technique is also a variant of spatial filtering.

Reconstruction Algorithms for the Probabilistic Inspection of Damage (RAPID) can be used. This type of mapping is based on the statistical analysis of the differences in certain features of the signals measured in a reference state (without defect) and in the current state (potentially damaged).

In one embodiment, the tomography is a volume ultrasonic wave tomography.

The free propagation of the elastic waves in an unlimited medium is governed by the only equations of the movement. In practice, the propagation medium is often limited by one or more boundaries. If these boundaries form a structure such that all its characteristic dimensions are very large in relation to the wavelength, the elastic waves can be called volume elastic waves (the boundaries do not disrupt the propagation of the waves in the volume but only induce a reflection when the wave approaches).

In one embodiment, the tomography is a guided ultrasonic wave tomography.

When a characteristic dimension of the propagation medium (for example, the thickness of the piping) approaches the wavelength, the elastic waves can be referred to as guided waves. Indeed, the waves reflect on the surfaces or boundaries of the medium (boundary conditions). The propagation of the waves is now governed both by the equations of the movement and by the boundary conditions imposed on the boundaries. The boundaries of the medium (of the structure) disrupt the propagation of the waves by constraining them.

A very wide variety of guided waves exists as a function of the structure and the properties of the media. In the case of thin structures such as plates and piping, the guided waves that naturally appear are Rayleigh-Lamb waves. In SHM, the Lamb waves excite the entire thickness of the structure and the Rayleigh waves propagate on the surface.

These waves can be analyzed as an overlay of successive reflections of volume waves on the surfaces of the structure.

In one embodiment, the tomography is carried out by analyzing the flight times.

Flight time analysis tomography is not always optimal. This imaging can be carried out by inverting all the flight times between the EMAT sensors, with each flight time for each pair of sensors being deduced from the passive inverse filter measurement.

Logic and/or Hardware Implementations.

The invention can be implemented from hardware and/or software elements. It can be available as a computer program product on a computer-readable medium. The medium can be electronic, magnetic, optical or electromagnetic. The computing means or resources can be centralized and/or distributed ("Cloud computing"), optionally with or in accordance with peer-to-peer and/or virtualization and/or redundancy technologies. The software code can be executed on any suitable processor (for example, a microprocessor) or processor core or a set of processors, whether they are provided in a single computation device or are distributed among a plurality of computation devices. The computing implementation of the invention can use centralized systems (e.g., client-server or master-slave) and/or distributed systems (e.g., peer-to-peer type architecture using accessible computing resources, optionally opportunistically e.g., ad-hoc networks, etc.). The system (or its variants) implementing one or more of the steps of the method can use one or more dedicated electronic circuits or a general-purpose circuit. The method also can be implemented on a reprogrammable computation machine (a processor or a microcontroller, for example) executing a program comprising a sequence of instructions, or on a dedicated computation machine (for example, a set of logic gates such as an FPGA or an ASIC, or any other hardware module). A dedicated circuit can, in particular, improve the performance capabilities. The reference to a computer program that, when executed, performs any of the previously described functions, is not limited to an application program that is executed on a single host computer. On the contrary, the terms computer and software program are used herein in a general sense to refer to any type of computer code (for example, application software, firmware, microcode, APIs, web services, or any other form of computer instruction) that can be used to program one or more processors in order to implement the steps of the method.

The invention claimed is:

1. A system for analyzing a tubular structure comprising:
   at least two electromagnetic-acoustic transducers (EMAT), being sensors;
   computation or memory resources, that are accessed locally or remotely and that are configured to decide a time to measure the ambient noise in the tubular structure and to determine, for at least a pair of sensors, on the basis of the diffuse acousto-elastic noise present in the structure, a function representing the impulse response of the tubular structure, wherein the two electromagnetic-acoustic transducers (EMAT) are supported by two rings disposed around the tube to be inspected, and being located at a configurable distance, being a liftoff, from the tubular structure.

2. The system as claimed in claim 1, wherein at least one ring is configured to allow the sensor that it supports to rotate about the axis of the tubular structure.

3. The system as claimed in claim 1, wherein at least one ring is configured to allow the sensor to translationally move relative to the axis of the tubular structure.

4. The system as claimed in claim 1, further comprising a plurality of electromagnetic-acoustic transducers (EMAT) arranged in a row and substantially parallel to the axis of the tubular structure to be analyzed.

5. The system as claimed in claim 1, wherein the arrangement of rings and sensors is permanently positioned around the tubular structure.

6. The system as claimed in claim 1, wherein a ring supporting one or more sensors is hinged, comprises interconnected circular or straight segments, so as to be able to conform to internal or external bent portions or variable diameter sections of the tubular structure.

7. The system as claimed in claim 1, wherein the determination of a function representing the impulse response is obtained by intercorrelation.

8. The system as claimed in claim 1, wherein the determination of a function representing the impulse response is obtained by a passive inverse filter.

9. The system as claimed in claim 1, wherein the determination of a function representing the impulse response is obtained by correlation of a coda of the correlation.

10. The system as claimed in claim 1, wherein the distance between an EMAT sensor and the liftoff of the tubular structure is adaptive or adapted, as a function of the obtained imaging or the signal processing.

11. A method for analyzing a tubular structure, with at least two electromagnetic-acoustic transducers (EMAT), being at least a pair of sensors supported by two rings disposed around the tube to be inspected, and being located at a configurable distance, being a liftoff, from the tubular structure, the method comprising a step of deciding a time to measure the ambient noise in the tubular structure and of determining, for the at least pair of sensors, a function representing the impulse response of said tubular structure on the basis of the diffuse acousto-elastic noise measured in the structure, with computation or memory resources that are accessed locally or remotely, said determining of the function representing the impulse response for each pair of sensors being carried out by intercorrelation or by a passive inverse filter or by correlation of a coda of the correlation.

12. The method as claimed in claim 11, further comprising a step of adhering a conductive film on the tubular structure.

13. The method as claimed in claim 11, further comprising a step of guided wave tomography for imaging the tubular structure.

14. A computer program product, said computer program comprising code instructions for carrying out the steps of the method of claim 11, when said program is executed on a computer.

* * * * *